United States Patent
Imai et al.

(10) Patent No.: US 11,359,082 B2
(45) Date of Patent: Jun. 14, 2022

(54) POLYPROPYLENE-BASED RESIN COMPOSITION AND MOLDED ARTICLE

(71) Applicant: PRIME POLYMER CO., LTD., Tokyo (JP)

(72) Inventors: Makoto Imai, Ichihara (JP); Takuya Shinozuka, Ichihara (JP); Yukimasa Tanaka, Ichihara (JP); Ichinosuke Hirano, Sodegaura (JP)

(73) Assignee: PRIME POLYMER CO., LTD., Tokyo (JP)

( * ) Notice: Subject to any disclaimer, the term of this patent is extended or adjusted under 35 U.S.C. 154(b) by 0 days.

(21) Appl. No.: 16/486,796

(22) PCT Filed: Feb. 22, 2018

(86) PCT No.: PCT/JP2018/006368
§ 371 (c)(1),
(2) Date: Aug. 16, 2019

(87) PCT Pub. No.: WO2018/159433
PCT Pub. Date: Sep. 7, 2018

(65) Prior Publication Data
US 2019/0375927 A1    Dec. 12, 2019

(30) Foreign Application Priority Data

Feb. 28, 2017    (JP) .............................. JP2017-035679

(51) Int. Cl.
*C08L 23/12*    (2006.01)
*C08K 3/013*    (2018.01)
*B29C 45/00*    (2006.01)
*C08K 3/04*    (2006.01)
*B29C 45/73*    (2006.01)
*C08K 3/08*    (2006.01)

(52) U.S. Cl.
CPC .......... *C08L 23/12* (2013.01); *B29C 45/0001* (2013.01); *B29C 45/0013* (2013.01); *C08K 3/013* (2018.01); *C08K 3/04* (2013.01); *B29C 2045/7356* (2013.01); *C08K 2003/0812* (2013.01); *C08K 2201/005* (2013.01)

(58) Field of Classification Search
CPC ........... C08L 23/12; C08K 3/013; C08K 3/04; B29C 45/0001; B29C 45/0013
See application file for complete search history.

(56) References Cited

U.S. PATENT DOCUMENTS

2005/0250892 A1    11/2005    Sugimoto et al.

FOREIGN PATENT DOCUMENTS

| JP | S62-106870 A | 5/1987 | |
|----|--------------|--------|---|
| JP | 2000-309638 A | 11/2000 | |
| JP | 2004-083608 A | 3/2004 | |
| JP | 2006-009034 A | 1/2006 | |
| JP | 2009-035713 A | 2/2009 | |
| JP | 2009-040928  * | 2/2009 | .............. C08L 23/14 |
| JP | 2009-138113 A | 6/2009 | |
| JP | 2013-108010 A | 6/2013 | |
| JP | 2013-227488 A | 11/2013 | |
| JP | 2014-076626 A | 5/2014 | |
| JP | 2016-145330 A | 8/2016 | |

OTHER PUBLICATIONS

English machine translation of JP 2009-040928 (Year: 2009).*
English machine translation of JP 2013-227488 (Year: 2013).*
International Searching Authority, "International Search Report," issued in connection with International Patent Application No. PCT/JP2018/006368, dated Apr. 17, 2018.
International Searching Authority, "Written Opinion," issued in connection with International Patent Application No. PCT/JP2018/006368, dated Apr. 17, 2018.

* cited by examiner

*Primary Examiner* — John E Uselding
(74) *Attorney, Agent, or Firm* — Foley & Lardner LLP

(57) ABSTRACT

Disclosed are: a polypropylene-based resin composition comprising 100 parts by mass of polypropylene-based resin (A) (provided that, when the polypropylene-based resin includes other resins and/or inorganic filler, the total amount of the polypropylene-based resin and other resins and/or inorganic filler is taken as 100 parts by mass), 0.80 to 5.0 parts by mass of on or more types of aluminum flakes (B) having an average particle size of 5 to 90 μm, and 0.005 to 0.06 parts by mass of carbon black (C); and a molded article obtained by injection-molding this polypropylene-based resin composition. The polypropylene-based resin composition and the molded article obtained from this are excellent in a flip-flop metallic feeling, a heavy luxury feeling, light resistance and a feeling of luminance.

6 Claims, No Drawings

POLYPROPYLENE-BASED RESIN COMPOSITION AND MOLDED ARTICLE

RELATED APPLICATIONS

The present application claims priority under 37 U.S.C. § 371 to International Patent Application No. PCT/JP2018/006368, filed Feb. 22, 2018, which claims priority to and the benefit of Japanese Patent Application No. 2017-035679, filed on Feb. 28, 2017. The contents of these applications are hereby incorporated by reference in their entireties.

TECHNICAL FIELD

The present invention relates to a polypropylene-based resin composition excellent in a flip-flop metallic feeling, a heavy luxury feeling, light resistance and a feeling of luminance, and a molded article obtained from this polypropylene-based resin composition.

BACKGROUND ART

Because of merits of plastics such as light weight, cheapness and easy molding, metal materials, inorganic materials and wood materials have been replaced with plastics in molded articles, contributing greatly to life of people, economy and environment. However, the appearance and feel of plastic molded articles may be given a cheap impression compared to molded articles made of metallic materials, inorganic materials or wood. Therefore, it is very significant to provide a plastic molded article which feels like a metal or has a heavy luxury feeling.

On the other hand, Patent Document 1 discloses a metallic paint containing an aluminum foil (aluminum flake). A molded article coated with a metallic paint has a flip-flop property that a color tone (lightness) felt visually is different depending on a viewing angle, that is, a difference in light receiving angle of emitted light of light reflected on a painted surface.

In recent years, in the field of automotive exterior materials, techniques for obtaining a resin molded article having a metallic feeling equivalent to that of a coated article have been studied. For example, Patent Document 2 describes that a thermoplastic resin composition having a flip-flop metallic feeling can be obtained by using aluminum flakes having a small particle size and pearl mica together. Here, the larger the difference in lightness between the highlight direction (the regular reflection direction with respect to the incident angle of light) and the shade direction (the non-regular reflection direction), the more human feels a metallic feeling, so it is required that this flip-flop property is high.

Patent Document 3 describes that, by using two or more kinds of aluminum flakes differing in average particle size as the brightener, it is possible to impart a high flip-flop property and a brilliance close to painting to an injection molded article. Patent Document 4 discloses a composition composed of a thermoplastic resin, a fibrous inorganic filler, a brightener (aluminum flake) and a colorant. As the colorant, 0.3 parts by mass of carbon black is blended. However, when 0.3 parts by mass of carbon black is added as the colorant, the lightness is low regardless of the angle of light reception, so that a flip-flop metallic feeling does not appear.

Patent Document 5 discloses a resin molded article containing a base material made of a thermoplastic resin, a black colorant (carbon black), and a particulate brightener (aluminum particles). It is described that a metallic tone appearance can be obtained as if many brighteners are contained even if the content of the brightener is small. However, the content of the brightener specifically used in the examples is 0.6% by mass, and such a small amount does not sufficiently exhibit a feeling of luminance.

Patent Document 6 discloses a metallic-like engine cover made of a resin composition containing polymethylpentene, polypropylene, a fibrous filler, a colorant and a brightener (aluminum particle). However, this resin composition is insufficient in terms of a flip-flop metallic feeling and a luxury feeling, and is not suitable as a material of a part where the appearance is very important.

RELATED ART DOCUMENTS

Patent Documents

Patent Document 1: JP S62-106870
Patent Document 2: JP 2006-009034
Patent Document 3: JP 2014-076626
Patent Document 4: JP 2009-035713
Patent Document 5: JP 2000-309638
Patent Document 6: JP 2013-227488

SUMMARY OF INVENTION

Technical Problem

An object of the present invention is to provide a polypropylene-based resin composition excellent in a flip flop metallic feeling, a heavy luxury feeling, light resistance and a feeling of luminance, and a molded article obtained from the polypropylene-based resin composition.

Solution to Problem

The present inventors have intensively studied to attain the above-described object and resultantly found that when aluminum flakes and carbon black are added each in specific amounts to a polypropylene-based resin composition excellent in light resistance, the synergetic effects of both are manifested remarkably and high-grade metallic feelings including a flip flop metallic feeling, a heavy luxury feeling and a feeling of luminance are obtained, leading to completion of the present invention.

Furthermore, the inventors of the present invention have found that when the ratio of lightness in the highlight direction (regular reflection direction with respect to incident angle of light) and lightness in the shade direction (non-regular reflection direction) of a molded article obtained from such a resin composition is a certain value or more and when the lightness in the shade direction is a certain value or less, high-grade metallic feelings including a flip-flop metallic feeling, a heavy luxury feeling and a feeling of luminance can be obtained, leading to completion of the present invention. That is, the present invention is specified by the following matters.

[1] A polypropylene-based resin composition comprising 100 parts by mass of a polypropylene-based resin (A) (provided that, when the polypropylene-based resin contains other resins and/or inorganic fillers, the total amount of the polypropylene-based resin and the other resins and/or inorganic fillers is taken as 100 parts by mass), 0.80 to 5.0 parts by mass of one or more kinds of aluminum flakes (B) having an average particle size of 5 to 90 μm and 0.005 to 0.06 parts by mass of carbon black (C).

[2] The polypropylene-based resin composition according to [1], wherein when incident light is irradiated from the direction of 45° to the surface of a test piece obtained by molding the polypropylene-based resin composition by the following injection molding method, the lightness in the highlight direction (L15°) and the lightness in the shade direction (L110°) defined below satisfy the following relationship:

$$L15°/L110° \geq 3.3$$

$$L110° \leq 27.0$$

[Lightness in Highlight Direction (L15°)]

When the regular reflection position of 90° with respect to the incident light at 45° is defined as 0°, the lightness in the highlight direction (L15°) is the lightness of the reflected light at an angle shifted toward the incident light direction side by 15° from this 0°.

[Lightness in Shade Direction (L110°)]

When the regular reflection position of 90° with respect to the incident light at 45° is defined as 0°, the lightness in the shade direction (L110°) is the lightness of the reflected light at an angle shifted toward the incident light direction side by 110° from this 0°.

[Injection Molding Method]

The polypropylene-based resin composition is injection-molded under conditions in which the barrel temperature is higher by (20 to 120°) C. than the highest temperature of the glass transition temperature and/or crystal melting temperature of the resin, the injection speed is 30 to 50 mm/sec, the mold set temperature is lower by (50 to 100°) C. than the highest temperature of the glass transition temperature and/or crystallization temperature of the resin, the cooling time is 10 to 20 seconds, and the mold clamping pressure is 30 to 80 t, to obtain a test piece composed of a square plate with a thickness of 2 mm.

[3] The polypropylene-based resin composition according to [1], further comprising 0.01 to 0.70 parts by mass of a chromatic inorganic pigment and/or organic pigment (D) (excluding carbon black).

[4] The polypropylene-based resin composition according to [1], comprising 70 to 100 parts by mass of a polypropylene-based resin (provided that, when the polypropylene-based resin contains other resins, the total amount of the polypropylene-based resin and the other resins is 70 to 100 parts by mass) and 0 to 30 parts by mass of an inorganic filler.

[5] A molded article obtained by injection-molding the polypropylene-based resin composition according to [1].

[6] The molded article according to [5], which is an automotive exterior material.

Advantageous Effect of Invention

In the polypropylene-based resin composition of the present invention, by adding specific aluminum flakes and carbon black in appropriate amounts respectively, surprisingly, a flip-flop metallic feeling and a feeling of luminance improve remarkably, a heavy luxury feeling is manifested by the decrease in lightness only in the horizontal direction with respect to the surface of the molded article, and further, sufficient light resistance is also expressed. Therefore, the molded article exhibits a good metallic feeling and a heavy luxury feeling even if it is unpainted, so it is extremely useful in various fields such as automobile exterior materials and industrial packaging materials for household electric appliances.

MODES FOR CARRYING OUT THE INVENTION

[Polypropylene-Based Resin (A)]

The resin component in the polypropylene-based resin composition of the present invention is mainly a polypropylene-based resin (A). However, other resins (resins other than the polypropylene-based resin (A)) may be contained together with the polypropylene-based resin (A). The proportion of the polypropylene-based resin (A) in 100% by mass of the resin component is preferably 50 to 100% by mass, more preferably 70 to 100% by mass. The type of the other resin is not particularly limited, and for example, polyethylene-based resins, polybutene-based resins, cyclic polyolefin-based resins, polyester resins, polyimide-based resins, polystyrene-based resins, ABS resins, AES resins, AS resins, acrylic resins and polycarbonate-based resins can be used. As the other resins, polyethylene-based resins are particularly preferred.

The polypropylene-based resin (A) includes, for example, at least one or more propylene homopolymers, random copolymers composed of propylene and ethylene and/or at least one or more monomers selected from olefins having 4 to 8 carbon atoms, and propylene block copolymers constituted of 60 to 95% by mass of 23° C. n-decane-insoluble portion (Dinsol) and 5 to 40% by mass of 23° C. n-decane-soluble portion (Dsol) (the total of Dinsol and Dsol is taken as 100% by mass).

The polyethylene-based resin as the other resin includes, for example, at least one or more ethylene homopolymers, ethylene copolymers having an intrinsic viscosity [n] of 0.5 to 3.0 dl/g and a density of 850 to 970 kg/m$^3$ obtained by copolymerizing ethylene and one or more α-olefins selected from α-olefins having 3 to 10 carbon atoms, high-pressure radical method low-density polyethylenes and ethylene-ethyl acetate copolymers. The intrinsic viscosity [n] of the ethylene copolymer is preferably 0.6 to 3.0, more preferably 0.6 to 2.5. The density of the ethylene copolymer is preferably 850 to 920 kg/m$^3$, more preferably 850 to 900 kg/m$^3$.

The polypropylene-based resin composition of the present invention may contain an inorganic filler together with the polypropylene-based resin (A). The proportion of the polypropylene-based resin is preferably 70 to 100 parts by mass, more preferably 80 to 100 parts by mass (provided that, when the polypropylene-based resin contains other resins, the proportion of the total amount of the polypropylene-based resin and the other resins is preferably 70 to 100 parts by mass, more preferably 80 to 100 parts by mass), and the proportion of the inorganic filler is preferably 0 to 30 parts by mass, more preferably 0 to 20 parts by mass. These proportions are based on the case where the total amount of the polypropylene-based resin, the other resins and the inorganic filler is 100 parts by mass. The type of the inorganic filler is not particularly limited and known inorganic materials can be used. Specific examples thereof include talc, mica, calcium carbonate, barium sulfate, glass fiber, gypsum, magnesium carbonate, magnesium oxide and titanium oxide. Among them, talc is particularly preferable.

The polypropylene-based resin (A) can also be used by further mixing various additives such as a crystallization nucleating agent, a lubricant, an antiblocking agent, a weathering stabilizer, a heat-resistant stabilizer and an antioxidant.

[Aluminum Flake (B)]

The aluminum flake (B) used in the present invention can be produced by a known method. Specifically, for example, it can be manufactured by pulverizing or grinding materials such as an atomized powder, an aluminum foil or a vapordeposited aluminum foil by a device such as a ball mill, an attritor or a stamp mill. Particularly, preferred is an aluminum flake obtained by grinding by a ball mill an aluminum powder obtained by an atomizing method. The purity of aluminum is not particularly limited, and it may be an alloy with another metal as long as it has spreadability. Specific examples of the another metal include Si, Fe, Cu, Mn, Mg and Zn.

The average particle size of the aluminum flake (B) is preferably 5 to 90 μm, and more preferably 10 to 70 μm. One type of the aluminum flake (B) may be used alone, or two or more types thereof may be used in combination.

The amount of the aluminum flake (B) blended is 0.8 to 5.0 parts by mass, preferably 1.0 to 3.0 parts by mass with respect to 100 parts by mass of the polypropylene-based resin (A) (provided that, when the polypropylene-based resin contains other resins and/or inorganic filler, the total amount of the polypropylene-based resin and other resins and/or inorganic filler is taken as 100 parts by mass). If the blending amount of the aluminum flake is too small, it is impossible to improve a feeling of luminance and a flip-flop metallic feeling. In contrast, if the blending amount of the aluminum flake is too large, mechanical properties such as impact strength may be deteriorated in some cases.

[Carbon Black (C)]

As the carbon black (C) used in the present invention, known carbon blacks can be used without particular limitation. The average particle size of the carbon black (C) is also not limited, but its primary particle size is preferably 10 to 40 nm.

When only the aluminum flake is blended, a flicker-flop metallic feeling is weak, deriving from the fact that the difference in lightness obtained by observation from the horizontal and diagonal directions (shade) and observation from the regular reflection direction (highlight) is not large. On the other hand, in the present invention, by addition of appropriate amounts of an aluminum flake (B) and carbon black (C), the lightness of the aluminum flake (B) is not disturbed in observation from the highlight, and the lightness of carbon black (C) is exerted in observation from the shade, and additionally, a sufficient feeling of luminance is also obtained, surprisingly. Although its mechanism is not necessarily clear, it is guessed that by addition of an appropriate amount of carbon black, it becomes possible to lower the lightness in shade direction by carbon black and to darken while keeping the lightness in highlight direction by the aluminum flake bright, and deep contrast is manifested and a flip-flop metallic feeling becomes more pronounced, and a heavy luxury feeling and a feeling of luminance are expressed.

Furthermore, by adding an appropriate amount of the carbon black (C), light resistance is more improved than the case of using only the aluminum flake (B) as the brightener.

The blending amount of the carbon black (C) is 0.005 to 0.06 parts by mass, preferably 0.008 to 0.03 parts by mass, more preferably 0.01 to 0.02 parts by mass with respect to 100 parts by mass of the polypropylene-based resin (A) (provided that, when the polypropylene-based resin contains other resins and/or inorganic filler, the total amount of the polypropylene-based resin and other resins and/or inorganic filler is taken as 100 parts by mass). When the amount of the carbon black (C) blended is too large, the lightness of the whole is lowered by hiding power of the carbon black (C) and there is a possibility that the expression itself of the flip-flop metallic feeling is inhibited.

[Pigment (D)]

The polypropylene-based resin composition of the present invention may contain a chromatic inorganic pigment and/or organic pigment (D) other than the carbon black (B). As the pigment (D), a known pigment can be used. Specific examples of the inorganic pigment include oxides, sulfides and sulfates of metals. Specific examples of the organic pigment include phthalocyanine type pigments, quinacridone type pigments and benzidine type pigments.

The blending amount of the chromatic inorganic pigment and/or organic pigment (D) (excluding carbon black) is preferably 0.01 to 0.70 parts by mass, more preferably 0.05 to 0.70 parts by mass, particularly preferably 0.10 to 0.60 parts by mass with respect to 100 parts by mass of the polypropylene-based resin composition (A) (provided that, when the polypropylene-based resin contains other resins and/or inorganic filler, the total amount of the polypropylene-based resin, other resins and/or inorganic filler is taken as 100 parts by mass).

[Various Additives]

To the polypropylene-based resin composition of the present invention, various additives such as a heat-resistant stabilizer, an antistatic agent, a weathering stabilizer, a light-resistant stabilizer, an antioxidant, a fatty acid metal salt and a dispersant can be blended if necessary, so long as the object of the invention is not impaired.

[Method for Producing Composition]

The polypropylene-based resin composition of the present invention can be produced by mixing the above-mentioned components and, if necessary, various additives by a known method. For example, the components may be mixed by a mixer or tumbler, or the mixture may be melt-kneaded by an extruder. Furthermore, it may be processed into pellets in order to improve the operability of the molding.

[Lightness]

When incident light is irradiated from the direction of 45° to the surface of a test piece obtained by molding the polypropylene-based resin composition of the present invention by the following injection molding method, the lightness in the highlight direction (L15°) and the lightness in the shade direction (L110°) defined below preferably satisfy the following relationship.

$$L15°/L110° \geq 3.3$$

$$L110° \leq 27.0$$

(Lightness in Highlight Direction (L15°))

When the regular reflection position of 90° with respect to the incident light at 45° is defined as 0°, the lightness in the highlight direction (L15°) is the lightness of the reflected light at an angle shifted toward the incident light direction side by 15° from this 0°.

(Lightness in Shade Direction (L110°))

When the regular reflection position of 90° with respect to the incident light at 45° is defined as 0°, the lightness in the shade direction (L110°) is the lightness of the reflected light at an angle shifted toward the incident light direction side by 110° from this 0°.

(Injection Molding Method)

The polypropylene-based resin composition is injection-molded under conditions in which the barrel temperature is higher by (20 to 120°) C. than the highest temperature of the glass transition temperature and/or crystal melting temperature of the resin, the injection speed is 30 to 50 mm/sec, the mold set temperature is lower by (50 to 100°) C. than the highest temperature of the glass transition temperature and/or crystallization temperature of the resin, the cooling time is 10 to 20 seconds, and the mold clamping pressure is 30 to 80 t, to obtain a test piece composed of a square plate with a thickness of 2 mm.

[Molded Article]

The polypropylene-based resin composition of the present invention can be processed into various molded articles by a known processing method (for example, injection molding or extrusion molding). Among them, it is suitable for injection molding. The resulting molded article exhibits a high flip-flop metallic feeling, a heavy luxury feeling and a feeling of luminance, so it can be used as a product without conducting post steps such as a coating step and a step of providing a skin.

The molded article of the present invention can be suitably used, for example, as an automobile part or an industrial packaging material of household appliances. In particular, the molded article of the present invention is excellent in a flip-flop metallic appearance, a heavy luxury feeling, light resistance and a feeling of luminance, so it is particularly useful as an automotive exterior material. The performance and the level required for the outer package vary actually depending on various conditions such as the vehicle type and the exterior position. The molded article of the present invention is extremely useful as an exterior material requiring a particularly high level of luxury feeling and a feeling of luminance, for example, an exterior material of a luxury car or an exterior material of a place that always stands out (for example, a bumper garnish of a SUV car).

EXAMPLES

Hereinafter, the present invention will be described in more detail based on examples, however, the present invention is not limited to these examples. Details of each component are described below.

<Polypropylene-Based Resin (A)>

"P-1": Block polypropylene ("Prime Polypro (registered trademark) J830HV" manufactured by Prime Polymer Co., Ltd., MFR (230° C., 2.16 kg)=30 g/10 min)

<Other Resins>

"P-2": ethylene-1-butene copolymer ("TAFMER (registered trademark) A0550" manufactured by Mitsui Chemicals, Inc., MFR=0.9 g/10 min, density=861 kg/m$^3$)

<Inorganic Filler>

"Talc": Talc (trade name "JM209", manufactured by Asada Milling Co., Ltd., average particle size=3.9 μm)

<Aluminum Flake (B)>

"Aluminum 1": Aluminum master batch (manufactured by Toyo Aluminum K.K., average particle size=20 μm, aluminum concentration=70%)

"Aluminum 2": Aluminum master batch (manufactured by Toyo Aluminum K.K., average particle size=60 μm, aluminum concentration=70%)

"Aluminum 3": Aluminum master batch (manufactured by Toyo Aluminum K.K., average particle size=10 μm, aluminum concentration=70%)

"Aluminum 4": Aluminum master batch (manufactured by Toyo Aluminum K.K., average particle size=70 μm, aluminum concentration=70%)

<Carbon Black (C)>

Trade name "BLACK PERLS 4840" manufactured by CABOT, average primary particle size=18 nm <Pigment (D)>

Trade name "Ultramarine Blue NO. 57" manufactured by HOLLIDAY PIGMENTS Ltd.

<Preparation of Resin Compositions (A-1) to (A-3)>

P-1, P-2 and talc were blended in the proportions shown in Table 1, to obtain resin compositions (A-1) to (A-3).

TABLE 1

|       | P-1 | P-2 | Talc |
|-------|-----|-----|------|
| (A-1) | 65  | 25  | 10   |
| (A-2) | 100 | 0   | 0    |
| (A-3) | 76  | 4   | 20   |

The maximum crystal melting temperature of the resin components of the resin compositions (A-1) to (A-3) was 162° C., the maximum crystallization temperature thereof was 115° C., and the glass transition temperature thereof was 0° C. or less. Based on these temperatures, the cylinder temperature of the injection molding machine was determined to 190° C. (162° C.+28° C.) and the mold set temperature was determined to 45° C. (115° C.-70° C.). The crystal melting temperature and the crystallization temperature were measured by the following method using DSC, and the glass transition temperature was measured by the following method using a solid viscoelasticity measuring device.

(Crystal Melting Temperature and Crystallization Temperature)

The crystal melting temperature and the crystallization temperature were measured using a DSC 8500 apparatus manufactured by Perkin Elmer. Regarding the temperature at the maximum peak position in the endothermic curve and the exothermic curve, about 5 mg of a sample cut out from a press sheet having a thickness of about 300 μm was packed in an aluminum pan having the flat bottom and kept at 230° C. in a nitrogen atmosphere (nitrogen: 20 ml/min) for 5 minutes, then, the temperature was lowered from 230° C. down to 30° C. at 10° C./min, and the temperature at the maximum peak in the exothermic curve of this process was taken as the crystallization temperature. Further, it was kept at 30° C. for 1 minute, then, the temperature was raised from 30° C. to 230° C. at 10° C./min, and the temperature at the maximum peak in the endothermic curve of this process was taken as the crystal melting temperature.

(Glass Transition Temperature)

The pellets were press-molded to prepare a molded article, and temperature dispersion measurement was carried out under the following conditions using a solid viscoelasticity measuring device, and the highest peak temperature at which tan δ, the ratio of the storage elastic modulus (E') to the loss elastic modulus (E"), is maximum was taken as the glass transition temperature.

Measuring device: RSA-II (manufactured by TA)
Measurement mode: Tension mode (Autotension, Auto-strain control)
Measurement temperature: −80 to 150° C. (up to measurable temperature)
Heating rate: 3° C./min
Sample size: width 5 mm×thickness 0.4 mm
Initial Gap (L0): 21.5 mm
Atmosphere: N$_2$ Reference Example 1, Examples 1 to 12,
Comparative Examples 1 to 10

The components were respectively blended in proportions shown in Table 2 (addition amount of aluminum flake in the table is the amount of aluminum flake in the masterbatch), and further, 0.10 parts by mass of a hindered phenol-based antioxidant (manufactured by Ciba Specialty Chemicals Inc., trade name "IRGANOX1010FP"), 0.05 parts by mass of a phosphorus-based antioxidant (manufactured by Ciba Specialty Chemicals Inc., trade name "IRGA FOS168") and 0.05 parts by mass of calcium stearate (manufactured by Nitto Chemical Industry Co., Ltd., trade name "Calcium Stearate") were blended with respect to 100 parts by mass of the blend, and preliminarily mixed with a Henschel mixer. Next, melt kneading was carried out using a twin-screw extruder at a resin temperature of 210° C., the molten strand was cooled in a water tank, and polypropylene-based resin pellets were obtained with a strand cutter.

Using the above pellets, the following test pieces for each evaluation were molded and evaluated, in Examples 1 to 12 and Comparative Examples 1 to 10. In Reference Example 1, the following test pieces for each evaluation were molded and a metallic synthetic resin enamel paint (trade name "NH-700 M (YK)" manufactured by Nippon Paint Automotive Coatings Co., Ltd.) was applied to the surface of the test piece, and then, it was evaluated. Details of the evaluation method are as follows. Each evaluation result is shown in Table 2.

(1) Lightness (L)

A square plate of 50 mm×90 mm×2 mm thick was injection-molded under the following conditions, and this was used as a test piece for lightness measurement.

EC-40N II manufactured by Toshiba Machine Co., Ltd.
Cylinder temperature: 190° C.
Screw rotation speed: 110 rpm
Weighing time: 7.5 sec
Holding pressure: 40 MPa
Back pressure: 5 MPa
Injection speed: 40 mm/s
Mold clamping pressure: 40 t
Mold set temperature: 45° C.
Cooling time: 10 sec As a lightness measuring device, a multi-angle spectrocolorimeter MA-98 manufactured by X-rite Co., Ltd. was used and an L value which is a lightness index of the obtained CIE colorimetric system was used. Then, incident light was irradiated from the direction of 45°, and the lightness in the highlight direction (L15°), that is, the lightness of the reflected light at the angle shifted by 15° from the regular reflection position 0° toward the incident light direction side (highlight direction) was measured, and the lightness in the shade direction (L110°), that is, the lightness of the reflected light at the angle shifted by 110° from the regular reflection position 0° toward the incident light direction side (shade direction) was measured, and the ratio) (L15°/L110° of both was calculated.

(2) Flip-Flop Type Metallic Feeling

As a test piece for evaluating a flip-flop metallic feeling, the same square plate of 50 mm×90 mm×2 mm thick as the test piece for measuring lightness described above was used. The lightness viewed perpendicularly to the surface of this test piece and the lightness viewed horizontally were visually confirmed and a flip-flop metallic feeling was evaluated according to the following criteria.

A: Difference between the lightness viewed perpendicularly to the surface of a test piece and the lightness viewed horizontally is very large.

B: Difference between the lightness viewed perpendicularly to the surface of a test piece and the lightness viewed horizontally is large.

(3) Heavy Luxury Feeling

As a test piece for evaluating a heavy luxury feeling, the same square plate of 50 mm×90 mm×2 mm thick as the test piece for measuring lightness described above was used. The surface of this test piece was visually confirmed, and a feeling of luminance was evaluated according to the following criteria.

A: When viewed horizontally with respect to the surface of a test piece, it looks deep black.

B: When viewed horizontally with respect to the surface of a test piece, it looks slightly deep black.

C: When viewed horizontally with respect to the surface of a test piece, it looks slightly blackish.

(4) Light Resistance

As a test piece for evaluating light resistance, the same square plate of 50 mm×90 mm×2 mm thick as the test piece for measuring lightness described above was used. As an evaluation equipment, a xenon weather meter was used, and an exposure test was carried out for 100 to 500 hours under conditions of a black panel temperature of 83° C. and an irradiation energy of 60 W/m$^2$, the change of the sample surface was visually confirmed, and light resistance was evaluated according to the following criteria.

A: No discoloration or cracking on the surface.
B: Almost no discoloration or cracking on the surface.
C: Discoloration and cracking are observed on the surface.
D: Discoloration and cracking on the surface are intense.

TABLE 2

| | Resin Composition | | Aluminum Flake (B) | | Carbon Black (C) | Pigment (D) | Lightness | | Flip-flop | Heavy | |
|---|---|---|---|---|---|---|---|---|---|---|---|
| | Type | parts by mass | Type | Addition Amount (parts by mass) | Addition Amount (parts by mass) | Addition Amount (parts by mass) | L15°/L110° | L110° | Metallic Feeling | Luxury Ffeeling | Light Resistance |
| Ref. Ex. 1 | A-1 | 100 | Painting of Metallic Synthetic Resin Enamel Paint Containing the Brightener | | | | 5.63 | 27.52 | A | B | — |
| Ex. 1 | A-1 | 100 | Aluminum 1 | 1 | 0.01 | — | 4.47 | 23.06 | A | A | B |
| Ex. 2 | A-1 | 100 | Aluminum 1 | 1 | 0.05 | — | 6.47 | 13.34 | A | A | A |
| Comp. Ex. 1 | A-1 | 100 | Aluminum 1 | 1 | 0 | — | 3.06 | 35.41 | B | C | C |
| Ex. 3 | A-1 | 100 | Aluminum 1 | 2 | 0.01 | — | 4.91 | 23.47 | A | A | B |
| Ex. 4 | A-1 | 100 | Aluminum 1 | 5 | 0.01 | — | 4.78 | 26.01 | A | A | B |
| Comp. Ex. 2 | A-1 | 100 | Aluminum 1 | 2 | 0 | — | 3.78 | 31.27 | B | C | C |
| Comp. Ex. 3 | A-1 | 100 | Aluminum 1 | 5 | 0 | — | 4.38 | 28.89 | B | C | D |
| Ex. 5 | A-1 | 100 | Aluminum 2 | 1 | 0.01 | — | 3.47 | 25.05 | A | A | B |
| Comp. Ex. 4 | A-1 | 100 | Aluminum 2 | 1 | 0 | — | 2.41 | 39.96 | B | C | D |
| Ex. 6 | A-2 | 100 | Aluminum 1 | 1 | 0.01 | — | 4.87 | 25.02 | A | A | B |
| Ex. 7 | A-2 | 100 | Aluminum 2 | 1 | 0.01 | — | 4.41 | 22.78 | A | A | B |

TABLE 2-continued

|  | Resin Composition | | Aluminum Flake (B) | | Carbon Black (C) | Pigment (D) | Lightness | | Flip-flop Metallic Feeling | Heavy Luxury Ffeeling | Light Resistance |
|---|---|---|---|---|---|---|---|---|---|---|---|
|  | Type | parts by mass | Type | Addition Amount (parts by mass) | Addition Amount (parts by mass) | Addition Amount (parts by mass) | L15°/ L110° | L110° | | | |
| Comp. Ex. 5 | A-2 | 100 | Aluminum 1 | 1 | 0 | — | 4.38 | 27.94 | B | B | C |
| Comp. Ex. 6 | A-2 | 100 | Aluminum 2 | 1 | 0 | — | 3.36 | 32.58 | B | C | D |
| Ex. 8 | A-3 | 100 | Aluminum 1 | 1 | 0.01 | — | 4.59 | 23.75 | A | A | B |
| Ex. 9 | A-3 | 100 | Aluminum 1 | 1 | 0.01 | — | 3.39 | 26.90 | A | A | B |
| Comp. Ex. 7 | A-3 | 100 | Aluminum 1 | 1 | 0 | — | 3.35 | 34.52 | B | C | C |
| Comp. Ex. 8 | A-3 | 100 | Aluminum 2 | 1 | 0 | — | 2.43 | 41.22 | B | C | D |
| Ex. 10 | A-1 | 100 | Aluminum 1 | 1 | 0.01 | 0.3 | 3.88 | 26.79 | A | A | B |
| Ex. 11 | A-2 | 100 | Aluminum 3 | 1 | 0.01 | — | 4.82 | 24.52 | A | A | B |
| Ex. 12 | A-2 | 100 | Aluminum 4 | 1 | 0.01 | — | 4.63 | 19.09 | A | A | B |
| Comp. Ex. 9 | A-2 | 100 | Aluminum 3 | 1 | 0 | — | 4.17 | 29.10 | B | B | C |
| Comp. Ex. 10 | A-2 | 100 | Aluminum 4 | 1 | 0 | — | 2.93 | 34.76 | B | C | D |

<Evaluation>

As is apparent from the results shown in Table 2, the molded articles of Examples 1 to 12 to which an appropriate amount of carbon black was added were excellent in a flip-flop metallic feeling and a heavy luxury feeling, and also excellent in light resistance, as compared with the molded articles of Comparative Examples 1 to 10 without addition of carbon black.

Lowering of the lightness in the shade direction is a phenomenon occurring by addition of an appropriate amount of carbon black regardless of the average particle size/addition amount of an aluminum flake, the presence or absence of pigments other than carbon black, the kind of the resin and the addition amount of an inorganic filler, and this phenomenon and the fact that the value obtained by dividing the lightness in highlight direction by the lightness in shade direction is large are guessed to improve a flip-flop metallic feeling and a heavy luxury feeling.

Examples 13 to 14, Comparative Examples 11 to 12

Pellets were prepared in the same manner as in Examples 1 to 12 except that the proportion of each component was changed to the proportion shown in Table 3. Using the pellets, test pieces for evaluating the lightness (L) described above and test pieces for evaluating a feeling of luminance described below were molded and evaluated. Details of the evaluation method of a feeling of luminance are as follows. Each evaluation result is shown in Table 3.

(5) Feeling of Luminance

As a test piece for a feeling of luminance, a square plate of 50 mm×90 mm×1 mm thick differing only in thickness from the test piece for measuring lightness described above was used. The surface of this test piece was visually confirmed, and a feeling of luminance was evaluated according to the following criteria.

A: Very high gloss feeling like a polished metal surface.
B: High gloss feeling like a polished metal surface.

TABLE 3

|  | Resin Composition | | Aluminum Flake (B) | | Carbon Black (C) | Pigment (D) | Lightness | | Feeling of Lluminance |
|---|---|---|---|---|---|---|---|---|---|
|  | Type | parts by mass | Type | Addition Amount (parts by mass) | Addition Amount (parts by mass) | Addition Amount (parts by mass) | L15°/ L110° | L110° | |
| Ex. 13 | A-2 | 100 | Aluminum 1 | 0.9 | 0.01 | — | 6.0 | 19.71 | A |
| Comp. Ex. 11 | A-2 | 100 | Aluminum 1 | 0.6 | 0.01 | — | 5.7 | 19.85 | B |
| Ex. 14 | A-2 | 100 | Aluminum 2 | 0.9 | 0.01 | — | 4.4 | 22.33 | A |
| Comp. Ex. 12 | A-2 | 100 | Aluminum 2 | 0.6 | 0.01 | — | 4.5 | 19.69 | B |

<Evaluation>

The feeling of luminance could not be quantified, and the reflectance in Example 13 (610 nm) was 38.36% and the reflectance in Comparative Example 11 (610 nm) was 35.94%, the reflectance of the molded article being considered to be a factor of the feeling of luminance.

INDUSTRIAL APPLICABILITY

The polypropylene-based resin composition and the molded article of the present invention are excellent in a flip-flop metallic appearance, a heavy luxury feeling, light resistance and a feeling of luminance, so they are useful in various fields such as automobile exterior materials and industrial packaging materials for home electrical appliances.

The invention claimed is:
1. A polypropylene-based resin composition, comprising a polypropylene-based resin (A) as the only resin component of the composition, or the polypropylene-based resin (A) and a polyethylene-based resin as the only resin components of the composition, and which comprise:

100 parts by mass of a polypropylene-based resin (A) (provided that, when the polypropylene-based resin composition contains the polyethylene-based resin and/or inorganic fillers, the total amount of the polypropylene-based resin (A) and the polyethylene-based resin and/or inorganic fillers is taken as 100 parts by mass), 0.80 to 5.0 parts by mass of one or more kinds of aluminum flakes (B) having an average particle size of 5 to 90 μm and 0.008 to 0.03 parts by mass of carbon black (C) and, wherein, when incident light is irradiated from the direction of 45° to the surface of a test piece obtained by molding the polypropylene-based resin composition by the following injection molding method, the lightness in the highlight direction)(L15°) and the lightness in the shade direction)(L110°) defined below satisfy the following relationships:

$L15°/L110°≥3.3$           1.

$L110°≤27.0$               2.

[Lightness in highlight direction ($L15°$)]    3.

When the regular reflection position of 90° with respect to the incident light at 45° is defined as 0°, the lightness in the highlight direction)(L15°) is the lightness of the reflected light at an angle shifted toward the incident light direction side by 15°) from this 0°,

[Lightness in shade direction ($L110°$)]      4.

When the regular reflection position of 90° with respect to the incident light at 45° is defined as 0°, the lightness in the shade direction)(L110°) is the lightness of the reflected light at an angle shifted toward the incident light direction side by 110°) from this 0°,

[Injection Molding Method]    5.

The polypropylene-based resin composition is injection-molded under conditions in which the barrel temperature is higher by (20 to 120°) C. than the highest temperature of the glass transition temperature and/or crystal melting temperature of the polypropylene-based resin (A) and the polyethylene-based resin, the injection speed is 30 to 50 mm/sec, the mold set temperature is lower by (50 to 100°) C. than the highest temperature of the glass transition temperature and/or crystallization temperature of the polypropylene-based resin (A) and the polyethylene-based resin, the cooling time is 10 to 20 seconds, and the mold clamping pressure is 30 to 80 t, to obtain a test piece composed of a square plate with a thickness of 2 mm.

2. The polypropylene-based resin composition according to claim 1, further comprising 0.01 to 0.70 parts by mass of a chromatic inorganic pigment and/or organic pigment (D) (excluding carbon black).

3. The polypropylene-based resin composition according to claim 1, comprising 70 to 100 parts by mass of the polypropylene-based resin (A) as the only resin component of the composition and 0 to 30 parts by mass of an inorganic filler.

4. A molded article obtained by injection-molding the polypropylene-based resin composition according to claim 1.

5. The molded article according to claim 4, which is an automotive exterior material.

6. The polypropylene-based resin composition according to claim 1, comprising 70 to 100 parts by mass of the polypropylene-based resin (A) and the polyethylene-based resin as the only resin components of the composition and 0 to 30 parts by mass of an inorganic filler.

* * * * *